M. H. BALLARD.
SELF LUBRICATING PULLEY.
APPLICATION FILED JAN. 8, 1918.

1,410,544.

Patented Mar. 28, 1922.

INVENTOR.

Milton H. Ballard.

UNITED STATES PATENT OFFICE.

MILTON H. BALLARD, OF LYNN, MASSACHUSETTS, ASSIGNOR TO UNITED SHOE MACHINERY CORPORATION, OF PATERSON, NEW JERSEY, A CORPORATION OF NEW JERSEY.

SELF-LUBRICATING PULLEY.

1,410,544.    Specification of Letters Patent.    Patented Mar. 28, 1922.

Application filed January 8, 1918. Serial No. 210,354.

*To all whom it may concern:*

Be it known that I, MILTON H. BALLARD, a citizen of the United States, residing at Lynn, in the county of Essex and State of Massachusetts, have invented certain Improvements in Self-Lubricating Pulleys, of which the following description, in connection with the accompanying drawings, is a specification, like reference characters on the drawings indicating like parts in the several figures.

This invention relates to a lubricating device and is herein illustrated as embodied in a structure for lubricating the bearing of a loose pulley.

It has been common to provide in a loose pulley an annular oil chamber and a member adapted to take oil from the chamber and apply it to the bearing.

In pulleys of the general type described, in which a wick or other member extends into the oil chamber and serves to take oil from the chamber and apply it to the bearing, two similar conditions arise during the time the pulley is being speeded up and during the time it is coming to rest. During the speeding up, the wick acts somewhat as a paddle until the body of oil attains momentum and becomes spread in a thin layer over the outer wall of the annular oil chamber. The moving wick, sweeping through the stationary or slowly moving oil, produces waves which travel toward the ends of the pulley and tend to carry some of the oil out through any ports or passages which may be present in the end walls of the pulley. A similar effect is also produced when the pulley is coming to rest except that in this case the wick lags behind the rapidly moving layer of oil and obstructs its path. In both cases, however, the oil is more or less tossed about and tends to be thrown out of the pulley at the ends thereof if any ports or openings are present. A feature of the invention comprises a baffle plate arranged to break up or prevent the formation of these waves and thereby to prevent slopping out of the oil. In the illustrative embodiment of the invention the wick, which is used to apply oil to the bearing, has a tail extending into the oil chamber; and between this tail and an inlet port in one end of the pulley two spaced, perforated baffle plates are located, the perforations in one plate being out of line with those in the other. The action of these baffle plates is cumulative and effectually prevents oil from being thrown out through the inlet port during the speeding up or the slowing down of the pulley.

In order to avoid the necessity of inserting the spout of an oil can into the annular inlet port, a procedure which might under some conditions present difficulties, as well as to ensure that any oil which may run out of the inlet port when the pulley is brought to rest will be returned to the oil chamber, another feature of the invention comprises a stationary member having means to receive oil from an oil can or other source of supply and direct it into the said inlet port, this member serving also to catch any drip of oil and direct it back into the oil chamber in the pulley. In the illustrative embodiment of the invention a collar fast to the shaft adjacent the inlet port is provided with properly shaped and located grooves and bevels to accomplish these ends.

These and other features of the invention, including certain details of construction and combinations of parts will be described as embodied in an illustrative device and pointed out in the appended claims.

Referring now to the accompanying drawings,—

Figure 1:
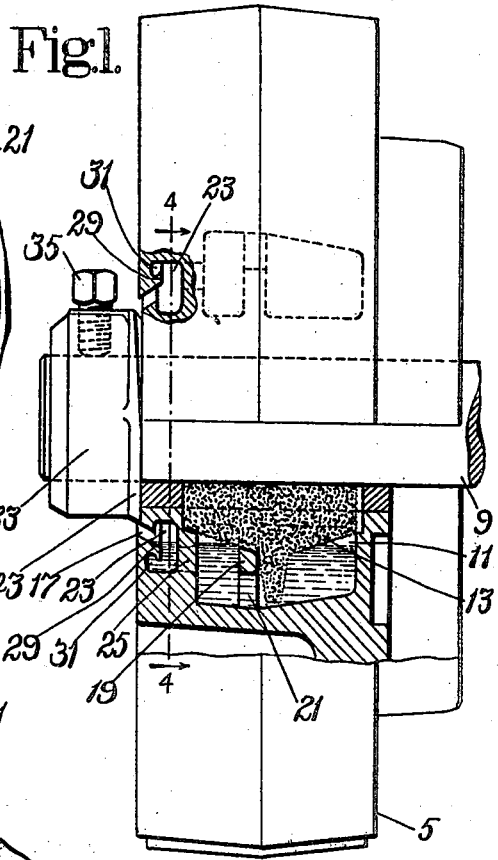
Fig. 1 is a front view, partly in elevation and partly in section, on the line 1—1 of Fig. 4 of a pulley in which the present invention is embodied.
Figure 2:
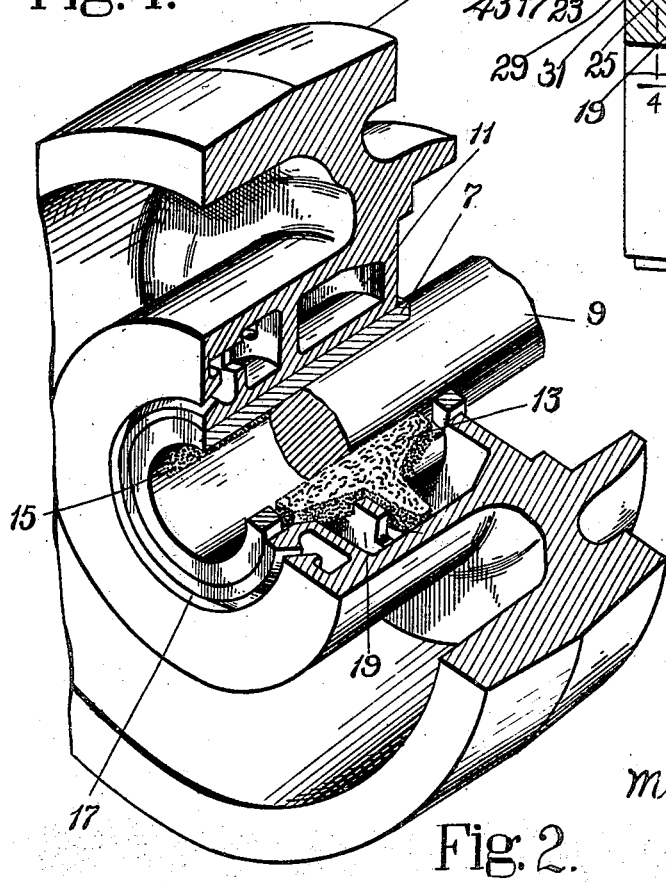
Fig. 2 is a perspective, partly in section of the pulley.

In the description which follows the words inner and outer will be used to designate locations which are respectively nearer to or farther from the axis of the shaft upon which the pulley is mounted The pulley 5 has at its center a bushing 7 to fit a stationary shaft 9 upon which the pulley is revoluble. In the hub of the pulley is an annular chamber 11 to hold the oil from which the shaft 9 is supplied. Two absorbent members 13 and 15 are provided to take oil from the chamber and apply it to the shaft; and since these members are alike only one of them will be described. The absorbent member or wick 13 is shaped as shown in Figs. 1 and 2, being supported by shoulders formed in the vertical walls of the oil chamber and having a tail which extends substantially to the outer wall of the oil chamber. The inner end of this absorbent member (the upper end in Fig. 1) extends through an elongated slot in the bushing 7 into contact with the periphery of the shaft 9. When the pulley is at rest the oil collects in the bottom of the oil chamber, as shown in Fig. 1; but, when the pulley is rotating, centrifugal force acts to spread the oil in a thin layer over the outer, curved wall of the chamber. The purpose of extending the tails of the absorbent members substantially to this outer wall is to ensure that oil will be conducted to the shaft while the pulley is rotating.

It is desirable to be able to supply oil to the oil chamber when the pulley is rotating as well as to be able to supply oil when the pulley is at rest without having to turn the pulley, as is commonly necessary, until an oil-hole is accessible. To this end there is provided in one end of the pulley an annular inlet port 17 which communicates with the annular oil chamber in the pulley. With the construction thus far described, the operator may at any time insert the spout of an oil can in the inlet port and supply oil to the oil chamber. Moreover if the pulley is at rest, he can see the surface of the oil and bring it to the proper level, which is about that indicated in Fig. 1.

Figure 4:
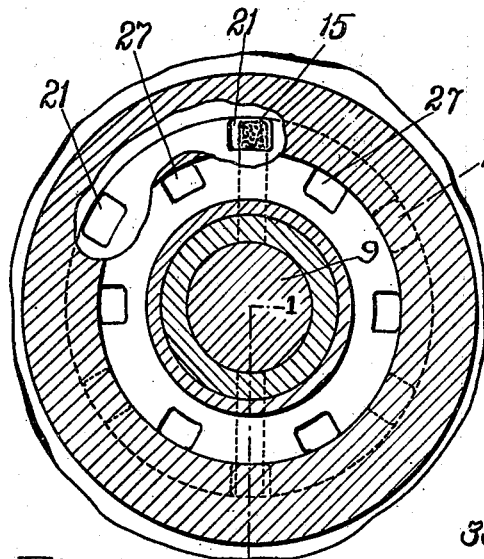
Fig. 4 is a section on line 4—4 of Fig. 1.

When power is applied to the pulley to rotate it, the absorbent members 13, 15 act at first as paddles and set up waves in the oil which move divergently toward the two ends of the pulley, this effect being particularly marked when power is first applied to the pulley before the oil has been spread by centrifugal force around the outer wall of the oil chamber and has had rotary motion imparted to it by the rotating pulley. If no further construction were provided than that which has been described above, a certain amount of oil would thus be thrown out through the inlet port 17. In order to prevent this undesirable result, an annular baffle plate 19 is located in the oil chamber 11 between the tails of the wicks or absorbent members 13, 15 and the inlet port 17, said plate being provided with spaced holes or passages 21. In order still further to guard against slopping out of oil through the inlet port when power is applied to the pulley to rotate it, the inlet port does not open directly into the oil chamber but into a compartment or auxiliary oil chamber 23 having a diameter less than that of the main oil chamber 11; and the two chambers are separated by a partition 25, which is in effect a second baffle plate, having spaced holes or passageways 27 which are staggered with respect to the holes 21 in the baffle plate 19 in the manner best shown in Fig. 4, the holes 27 having different angular locations than the holes 21 and being located nearer the axis of the shaft 9. Consequently the waves, which are formed in the oil when power is first applied to the pulley or when power is withdrawn from the pulley, are broken up and reduced by one or both of the baffle plates to such an extent that the oil is prevented from being thrown out through the inlet port 17.

Figure 3:
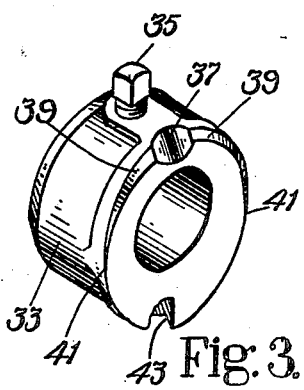
Fig. 3 is a perspective of the stationary member for directing the oil from an oil-can or other source of supply into the oil chamber in the pulley.

Soon after the pulley starts to rotate, and thereafter as long as the rotation continues, the oil is spread out as a layer on the outer wall of the oil chamber and no tendency to throw it out through the inlet port exists. When, however, power is withdrawn from the pulley and the pulley slows down and finally comes to rest, some of the oil is liable to reach the inlet port and run out upon the end of the pulley. In order to avoid this occurrence, the walls of the inlet port 17 and of the auxiliary oil chamber 23 are peculiarly constructed, and a peculiarly shaped collar is fastened to the shaft close to that end of the pulley in which the inlet port is formed. Referring more particularly to Fig. 1, the compartment or auxiliary oil chamber 23 is of a diameter less than that of the main chamber 11; and upon that wall of the auxiliary chamber 23 through which the circular inlet port 17 extends is an annular ledge 29 having formed therein a circular groove 31. Fastened to the shaft 9 close to the inlet end of the pulley is a collar 33 (see Fig. 3), a set screw 35 serving to hold the collar in place. Formed in the upper portion of the collar is a groove 37 which extends from the upper surface of the collar diagonally downward to that end which is located adjacent to the end of the pulley. The edge at the end of the pulley, beginning at the groove 37 and extending about ninety degrees in both directions, is beveled as indicated at 39, these beveled faces gradually narrowing to points in the localities indicated at 41. Between the points 41 and extending around the lower one hundred and eight degrees of the end of the collar, the edge is flared out on a bevel as indicated at 43, the beveled surface 43 throughout most of its extent being a continuation of the surface of the inner wall of the circular inlet port 17 as shown in Fig. 1. The pulley 5 has a slight countersink about its bore at that end in which the inlet port is formed; and the collar 33 extends into this countersink.

Considering that the pulley has just come to rest in the position shown in Fig. 1, there will still be some oil on the upper portions of the outer walls of the chambers 11 and 23. One purpose of the construction which has just been described is to ensure that none of this oil shall run out upon the end of the pulley. Since most of this oil will obviously run back into the lower portions of the chambers 11 and 23, it will be sufficient to point out possible courses which may be taken by oil which is lodged on the upper portion of the outer wall of the chamber 23. Any oil which runs down the right-hand wall of this chamber or drops upon the inner wall thereof will run around the shaft and down into the lower portion of the chamber. Any oil which runs down the left-hand wall or drops into the groove 31 will follow that groove around the shaft and also find its way into the lower portion of the chamber 23. Any oil which runs down the upper portion of the outer wall of the inlet port 17 will drop into the groove 37 or fall upon the beveled faces 39 from whence it will run upon the beveled face 43, and from there it will run upon the lower portion of the inner wall of the inlet port 17 and thus reach the lower portion of the chamber 23. Consequently all of the oil will eventually find its way into the position in which it is shown in Fig. 1. The outside of the pulley, the belt and everything adjacent the pulley is thus kept free of oil.

Oil may be supplied to the pulley at any time by squirting or dropping oil into the groove 37 of the collar. Or the collar might be dispensed with so far as the supplying of oil is concerned and the spout of the oil can inserted in the inlet port 17. Although the pulley may be supplied with oil at any time whether rotating or at rest, it is preferable to perform this operation while the pulley is at rest for the reason that the operator may then supply just the right amount of oil because he can look through the inlet port 17 and note just what is the level of the oil.

Although the invention has been set forth as embodied in a particular device, it should be understood that the invention is not limited in the scope of its application to the particular device which has been shown and described.

Having thus described my invention, what I claim as new and desire to secure by Letters Patent of the United States is:

1. A stationary shaft, a device rotating upon the shaft, said device having an oil chamber therein and an inlet port communicating with said chamber, and a stationary member having a groove in its upper portion into which oil may be squirted and surfaces leading from the groove adapted to conduct the oil from the groove into the inlet port.

2. A device of the class described having a bore to receive a shaft, an annular oil chamber surrounding the bore, a member carried thereby and adapted to take oil from the chamber and apply it to the shaft, and an annular inlet port communicating with the chamber whereby oil may be supplied to the chamber in any angular position which the device may occupy.

3. A device of the class described having a bore to receive a shaft, an annular oil chamber surrounding the bore, a member adapted to take oil from the chamber and apply it to the shaft, an annular inlet port communicating with the chamber whereby oil may be supplied to the chamber in any angular position which the device may occupy, and a baffle plate adjacent to said member to prevent oil from being thrown out of the chamber through the inlet port.

4. A device of the class described having a bore to receive a shaft, an annular oil chamber surrounding the bore, a member adapted to take oil from the chamber and apply it to the shaft, said applying member having a portion extending outwardly into said chamber, an inlet port in one end of the device, a passageway connecting the inlet port with the chamber, and a perforated baffle plate located in the chamber between the inlet port and the outwardly extending portion of the oil-applying member.

5. A device of the class described having a bore to receive a shaft, an annular oil chamber surrounding said bore, a passage connecting the bore with the chamber, an absorbent member extending through said passage and adapted to receive oil from the chamber and apply it to the shaft, said absorbent member having a tail extending substantially to the outer wall of the annular chamber, an annular baffle plate located at one side of said tail, an annular opening in that end of the pulley which is located on the same side of the tail as is the baffle plate, and passageways leading from the opening to the chamber.

6. A device of the class described having a bore to receive a shaft, an oil chamber surrounding the bore, a passage connecting the bore with the chamber, a member adapted to take oil from the chamber and apply it through the passage to the shaft, an auxiliary oil chamber of less diameter than the first, a passage connecting the two chambers, and an annular inlet port in one end of the device communicating with the auxiliary oil chamber.

7. A device of the class described having a bore to receive a shaft, an annular main oil chamber surrounding the bore, a passageway connecting said bore and chamber, a wick extending through the passageway and having a portion extending outwardly into the main oil chamber, an auxiliary oil chamber located at one side of the main oil chamber, the auxiliary chamber being of less diameter than that of the main chamber, a perforated baffle plate located in the main oil chamber, a second perforated baffle plate separating the two chambers, the perforations in one plate being out of line with those in the other, and an annular inlet port leading into the auxiliary chamber.

8. A device of the class described having a bore to receive a shaft, an annular oil chamber surrounding the bore, means for supplying oil from the chamber to the shaft, an annular inlet port concentric with but of less diameter than the oil chamber, and an annular ledge of greater diameter than the inlet port extending into the oil chamber and provided with an annular groove to conduct oil which drips down upon the ledge into the bottom of the oil chamber.

9. A stationary shaft, a device rotatably mounted on the shaft, said device having an oil chamber and an inlet port communicating therewith, and a stationary member co-operating with the hub of the pulley to receive oil from a source of supply and to direct the oil into the inlet port irrespective of the angular position which the rotary device may occupy.

10. A stationary shaft, a device rotatably mounted on the shaft, said device having an oil chamber and an annular inlet port the walls of which are inclined outwardly from the axis of rotation in a direction from the end of the pulley to the interior thereof, and a stationary oil-receiving and conducting member having its oil-delivering end located adjacent the inlet port, the lower portion of the end of the member having an outwardly flaring surface which is a continuation of the surface of the inner wall of the adjacent portion of the inlet port.

11. A pulley, a shaft upon which the pulley is rotatably mounted, said pulley having an oil chamber therein, an inlet port through which oil may be supplied to the chamber, and means for receiving oil which may run out through the inlet port and for directing it back into the oil chamber.

In testimony whereof I have signed my name to this specification.

MILTON H. BALLARD.